(12) United States Patent
Carter et al.

(10) Patent No.: US 6,367,939 B1
(45) Date of Patent: Apr. 9, 2002

(54) REARVIEW MIRROR ADAPTED FOR COMMUNICATION DEVICES

(75) Inventors: John W. Carter, Holland; Robert W. Grimes, III, Spring Lake, both of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/769,854

(22) Filed: Jan. 25, 2001

(51) Int. Cl.⁷ .............................................. G02B 7/182
(52) U.S. Cl. ...................... 359/879; 359/881; 359/871
(58) Field of Search ................................ 359/879, 881, 359/871, 872; 296/97.5, 37.1, 37.7, 37.8, 97 H, 97 R

(56) References Cited

U.S. PATENT DOCUMENTS

| | | |
|---|---|---|
| 4,056,696 A | 11/1977 | Meyerle et al. |
| 4,275,916 A * | 6/1981 | Skogler ..................... 296/97 H |
| 4,706,273 A | 11/1987 | Spear et al. |
| 4,930,742 A | 6/1990 | Schofield et al. |
| 5,140,108 A * | 8/1992 | Miyajima ................... 174/52.1 |
| 5,364,153 A * | 11/1994 | Vaxelaire .................... 296/97.5 |
| 5,576,687 A | 11/1996 | Blank |
| 6,026,162 A | 2/2000 | Palett et al. |
| 6,116,743 A * | 9/2000 | Hoek .......................... 359/871 |
| 6,134,528 A * | 10/2000 | Sobieski et al. ........... 296/37.7 |
| 6,166,698 A | 12/2000 | Turnbull |

* cited by examiner

Primary Examiner—Mohammad Sikder
(74) Attorney, Agent, or Firm—Brian J. Rees; Price Heneveld Cooper Dewitt & Litton

(57) ABSTRACT

A mount adjustably supports a mirror assembly to a vehicle windshield. The mount includes a housing with a pocket shaped to completely receive a portable communication device, such as a portable telephone, with the device's antenna extending from the pocket. A door on the mount is positioned to close and positively capture the communication device in the mount housing. The door includes a push-push latch to provide secure retention of the communication device, but further includes a dampener for smooth door movement. The door is aesthetically designed for optimal function and appearance.

27 Claims, 2 Drawing Sheets

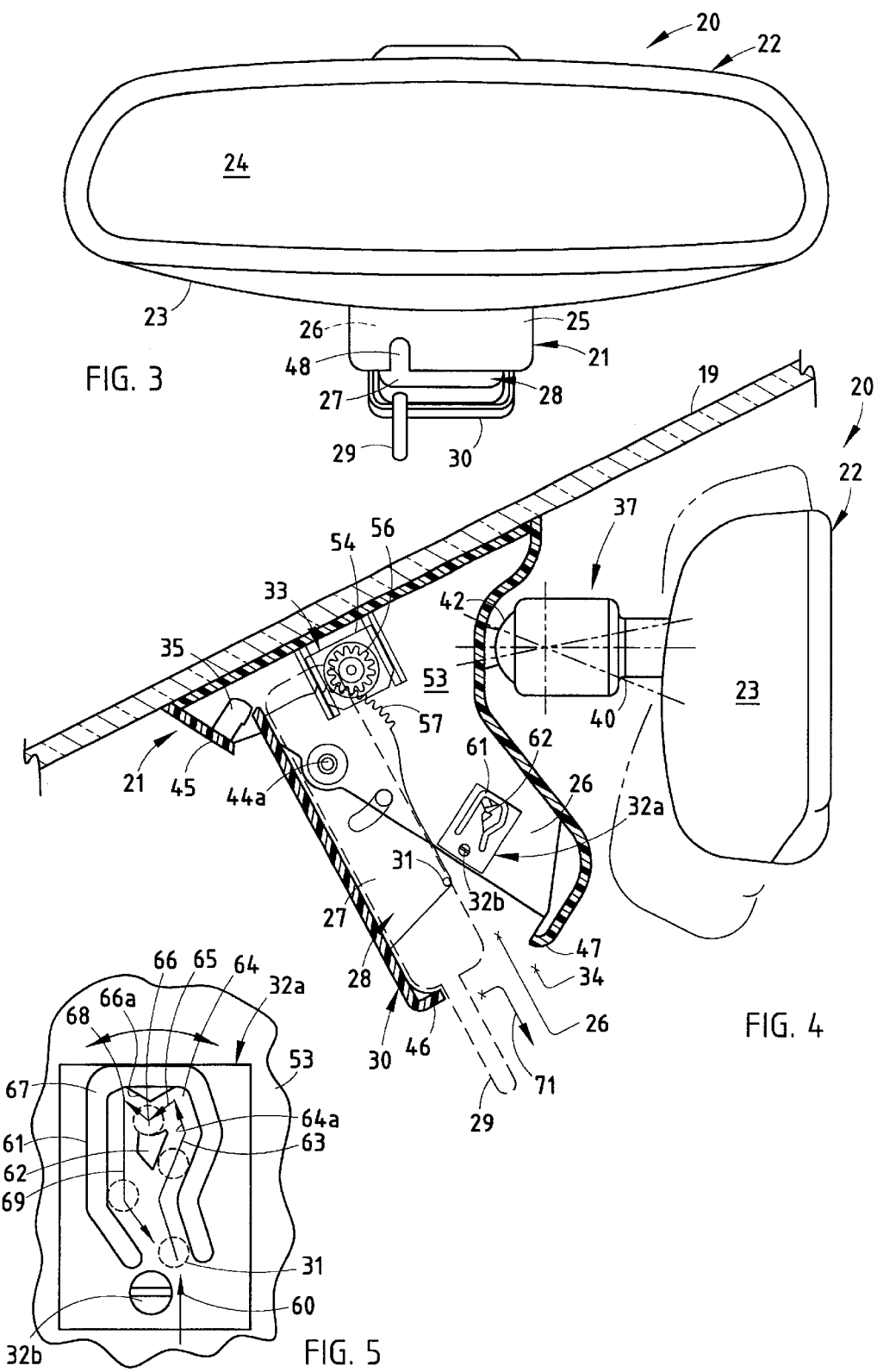

REARVIEW MIRROR ADAPTED FOR COMMUNICATION DEVICES

BACKGROUND OF THE INVENTION

The present invention relates to vehicle mirror apparatus, and more particularly relates to a mirror and mounting assembly including a docking station for receiving an electronic device, such as a telecommunication device.

It is known to provide a rearview mirror assembly with a holster to receive a portable telematic communication device, such as a telephone. (For example, see Palett U.S. Pat. No. 6,026,162.) However, improvements are desired in more positively retaining the portable telephone to the mirror in the event of a vehicle crash so that the telephone does not become part of flying debris that could injure a passenger. Further, improvements are desired for aesthetics (such as to fully hide the telematic communication device), for simplicity of manufacture, and for ensuring complete nesting of the portable communication device and/or telematics device in the docking station of the mirror, so that all contacts for recharging and for remote antenna, microphone, speakers, and the like are reliably made.

Accordingly, an apparatus is desired solving the aforementioned problems and having the aforementioned advantages.

SUMMARY OF THE INVENTION

In one aspect of the present invention, a rearview vehicle mirror apparatus includes a mirror assembly and a mount supporting the mirror assembly, with the mount being adapted to support the mirror assembly on a vehicle windshield. One of the mirror assembly and the mount includes a first housing with a pocket shaped to receive a portable electronic communication device, such as a telematic device or cellular phone, and further includes a door shaped to cover the pocket. The door is movable between an open position providing access to the pocket and a closed position for positively retaining the communication device within the pocket.

In another aspect of the present invention, a rearview vehicle mirror apparatus includes a mirror assembly having a housing and a mount supporting the mirror assembly, where the mount is adapted to adjustably support the mirror assembly proximate a vehicle windshield. One of the housing and the mount includes a pocket with an access opening shaped to receive a portable electronic communication device, and further includes a retainer shaped to selectively cover at least a portion of the access opening to positively retain the communication device in the pocket.

In yet another aspect of the present invention, an apparatus is provided for holding a portable electronic communication device that includes a body and an antenna. The apparatus includes a mirror assembly having a first housing and a mirror supported in the first housing. A mount supports the first housing and includes a second housing. At least one of the first and second housings includes a pocket shaped to completely receive the body of the communication device.

These and other features, advantages, and objects of the present invention will be further understood and appreciated by those skilled in the art by reference to the following specification, claims, and appended drawings.

BRIEF DESCRIPTION OF THE DRAWINGS

FIG. 3 is a front view of the apparatus shown in FIG. 1, but with the door open;

FIG. 4 is a cross section similar to FIG. 2 but with the door open; and

FIG. 5 is a fragmentary side view of the push-push groove shown in FIGS. 2 and

DETAILED DESCRIPTION OF PREFERRED EMBODIMENT

Figure 1:
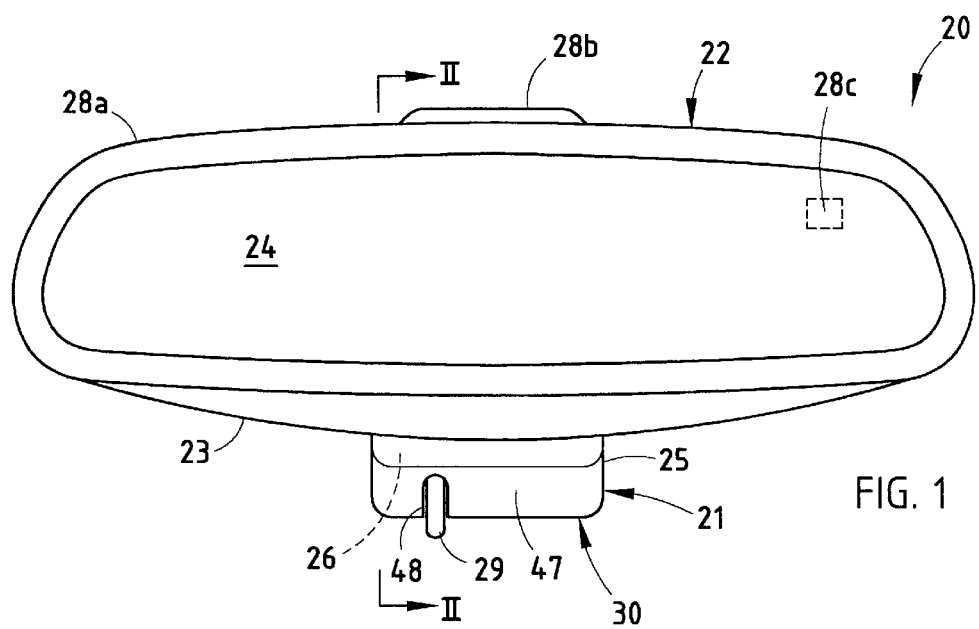
FIG. 1 is a front view of a mirror and mount apparatus embodying the present invention.
Figure 2:
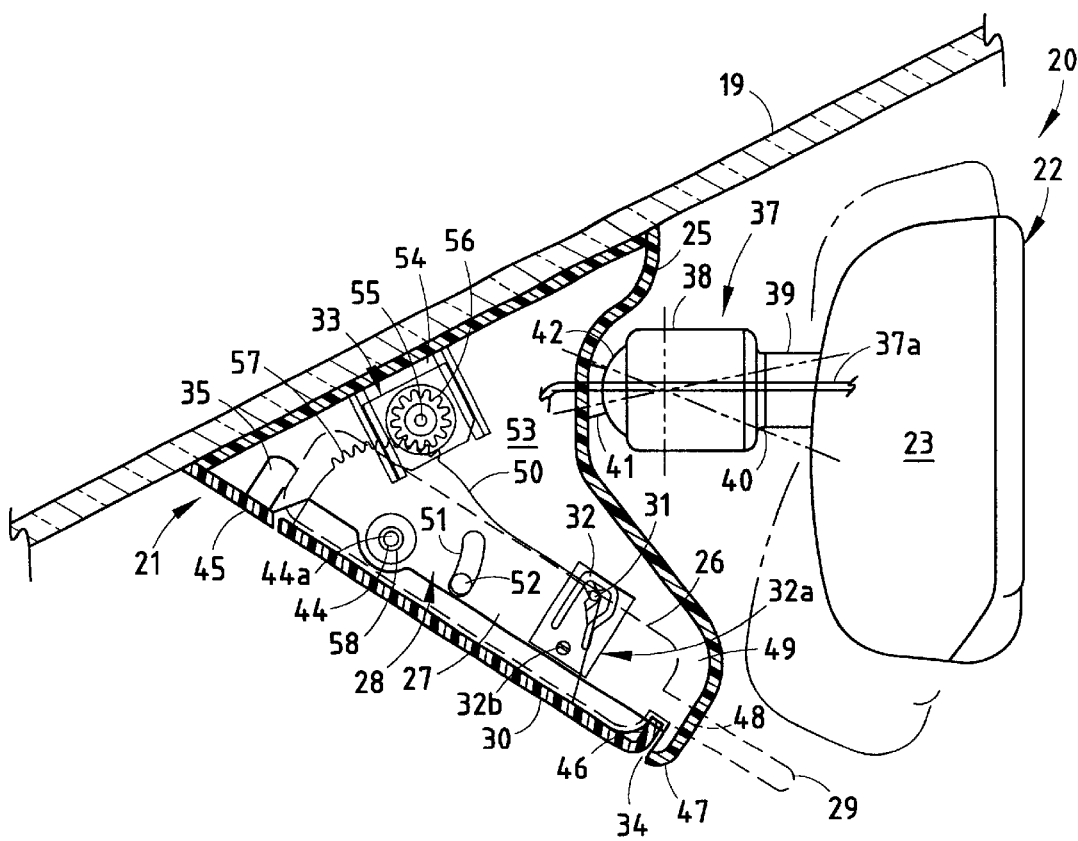
FIG. 2 is a cross section taken along the lines II—II in FIG. 1.

The present apparatus 20 (FIGS. 1–2) includes a mount 21 and a vehicle rearview mirror assembly 22 supported by the mount 21 on a vehicle front windshield 19. The assembly 22 includes a mirror housing 23 and a mirror 24. The mount 21 includes a mount housing 25 defining a pocket 26 shaped to completely receive the body 27 of a portable communication device 28, such as the illustrated cellular portable telephone. The telephone's antenna 29 can extend from the pocket 26, if desired, or can be located completely in the pocket 26 and covered by door 30. A door 30 on the mount 21 is positioned to close and positively capture the telephone body 27 in the mount housing 25. The door 30 includes a push-push latch follower 31 that operably engages grooves 32 on the mount housing 25 to provide secure retention of the communication device 28, but further includes a dampener 33 geared to slow down and smooth out movement of the door 30 and that is aesthetically designed for optimal function and appearance.

Rearview mirror assemblies are well known in the art, such that a detailed description of the illustrated mirror assembly 22 is not needed herein for an understanding of the present invention to a person of ordinary skill in this art. The illustrated mirror assembly 22 includes a circuit board and associated circuitry and electronics located within the mirror housing 23 (and mount housing 25) for operating the electrochromic mirror 24 and for operating various vehicle functions, such as keyless entry, passenger air bag control, GPS and navigational/directional sensing, external environment sensing such as for temperature and daylight, button controls, information displays, etc. It is further contemplated that the illustrated apparatus 20 will further include circuitry within the housings 23 and 25 for enhanced performance of the communication device 28, such as a supplemental antenna, remote speakers 28A, a remote microphone 28B, an information display 28C, data/information memory, and means for recharging the device. (For example, see U.S. Pat. No. 6,026,162.)

Mount 21 (FIG. 2) includes a molded mount housing 25 defining the pocket 26 and an access opening 34 to the pocket 26. A connector 35 with contacts is positioned within the pocket 26, either on the housing 25 or on the door 30, for contact with a mating connector on the communication device 28, so that the communication device 28 can be electrically connected to and slaved to circuits within the mount 21 and mirror assembly 22 when the communication 28 is docked in the mount 21. It is noted that the illustrated contacts slidingly engage as the door 30 is closed, but the contacts can also be positioned on the side flange 50, sidewall 53, or flange 46 to create a sliding contact for reliable electrical contact as the device 28 is slid into the door 30.

The mirror assembly 22 is supported on the mount 21 by a double ball adjustment device 37 such as is disclosed in patent 6,068,380. Specifically, the double ball adjustment device 37 includes a tube section 38, with a first tubular member 39 on the mirror assembly 22 defining a first ball 40 that rotatably engages a first end of the tube section 38, and a second tubular member 41 on the mount 21 defining a second ball 42 that rotatably engages the second end of the tube section 38. An internal spring (not specifically shown) keeps pressure on the balls 40 and 42 to hold a selected angular adjustment. The tube section 38 and members 39 and 41 are hollow and configured to form a passageway for wiring 37A that extends from mirror assembly 22 through the device 37 to the mount 21. (It is contemplated that a single ball adjustment device or other adjustment device or support can also be used.)

The illustrated communication device 28 is a portable telephone, but the term is intended to include other portable electronic communication devices such as personal data apparatus (PDAs), pagers, "beepers", GPS devices and the like. The communication device 28 is further intended to include a car-identification or person-identification device and/or toll booth automatic-paying device, such as would be used to pay fees at a toll booth on a turnpike or highway. The communication device 28 includes a body 27 and an antenna 29 extending from the body 27, but it is contemplated that the antenna 29 could be an internal antenna hidden within or positioned adjacent the body 27.

The door 30 (FIG. 2) is pivoted at location 44 for rotation about axis 44A, and has an outer wall shape that, when the door is closed, generally matches and lies flush with an exterior surface of a bottom wall 45 of the mount housing 25. The illustrated outer wall of door 30 is relatively flat, but it is contemplated that alternative three-dimensional door shapes are possible to match a decor of a particular vehicle model. The edge of the door 30 closest to the driver includes an "up" flange 46 that overlaps with an lower edge 47 of the bottom wall 45 to minimize a driver's ability to see into the gap therebetween. A notch 48 is formed in the lower edge 47 for receiving the antenna 29 of the device 28 when the door 30 is closed. The notch 48 assures that the device 28 is properly oriented in the door 30 and for fitting into the pocket 26. It is contemplated that the notch 48 could also be in the "up" flange 46 of the door 30 as well. Stiffening ribs 49 are added to the mount housing 25 to maintain a shape of the mount housing 25, particularly around the marginal material of the housing defining the access opening for the door 30 and around the double ball adjustment device 37. The door 30 includes side flanges forming a pocket for closely receiving the device 28, and that are shaped to mateably fit into the pocket 26 of the housing 25. The side flanges are designed to frictionally hold the device 28 well enough so that it will not fall out when the door 30 is opened.

A motion limiting arrangement is provided on a perpendicular side flange 50 on the door 30 in the form of a slot 51 in side flange 50 and a follower pin 52 on a sidewall 53 of the mount housing 25. The slot 51 extends arcuately about the pivot axis 44A and has ends that abut the pin 52 when the door 30 is moved to the closed or open positions, thus limiting the door movement.

The dampener 33 includes a pot 54 attached to the sidewall 53 and filled with viscous material, and a rod 55 with one end in the pot and another end supporting a pinion gear 56. The side flange 50 on the door 30 includes a rack of teeth 57 arranged to engage the pinion gear 56 on the dampener 33. As the door 30 is opened (or closed), the rack 57 moves past the pinion gear 56, causing the rod 55 to rotate. The viscous material in the pot 54 dampens the door movement, causing the door 30 to move with a clean and consistently smooth motion. A spring 58 on the pivot 44 biases the door 30 toward an open position. By biasing the door 30 toward an open position, it is contemplated that it is less likely for a driver to believe that the door 30 is fully closed when in fact the door is only partially closed and could fly open, such as during a collision. Nonetheless, it is contemplated that the door 30 could be biased toward a closed position, if desired.

The illustrated push-push latch includes the push-push follower 31 on the side flange 50 of the door 30 in the form of a fixed pin. A track member 32A (FIG. 4) is pivoted to the sidewall 53 of the mount housing 25 at location 32B. The track member 32A is a stamped or molded part and has the push-push groove 32 formed therein. The groove 32 includes a throat 60, an inverted U-shaped perimeter ridge 61, and an island deflector 62. As the door 30 is closed, the follower 31 enters the throat 60 and engages the island deflector 62 and the side surface 64A so that the track member 32A pivots and the follower 31 moves along path 63 to position 64. When the door 30 is released, the follower 31 drops downward but engages a corner of the island deflector 62 so that it moves along path 65 to a latched position 66. The door 30 is thus held in a closed position, with the spring 58 biasing the door 30 and follower 31 against the upwardly-facing depression in the island deflector 62. When the door 30 is again pushed, the follower 31 engages a side surface 66A and so that the track member 32A pivots and the follower 31 moves to position 67 along path 68. When the door 30 is released, the follower 31 moves along path 69 and downwardly out the throat 60, such that the door 30 opens until the pin 52 engages an end of the slot 51 (FIG. 4) to stop the door 30 in its open position. The communication device 28 is removed by lifting it over lip 46 and out along path 71 (FIG. 4).

It is noted that there are a variety of different push-push latches that can be used with the present invention. For example, instead of pivoting the track member 32A, the groove 32 can be permanently formed in the side wall 53, and the follower 31 can be made to move such as by forming the pin follower 31 on the end of an arm pivoted to the side flange 50 of the door 30. The movement of the pin along the groove would be the same, as discussed above. It is also contemplated that a separate button can be operably mounted on the housing 25 or on the door 30 to open the door 30. Also, separate buttons for operating electronics in the mount and mirror can be positioned on housing 25 of mount 21. It is contemplated that operation of the illustrated door 30 is sufficiently similar to a depressible button, such that a separate showing of a button arrangement is not required. By this arrangement, a mini-console can be formed on the mount 21 within easy reach of a vehicle driver.

It is contemplated that the pocket, access opening and door can be in the mirror housing instead of in the mount housing, or that both could include a pocket for receiving an electronic device. It is further contemplated that the pocket can be oriented in different directions, such as into a side of the mount 21, or an end of the mirror housing 23, or into a top of either of the housings 23 and 25.

In the foregoing description, those skilled in the art will readily appreciate that modifications may be made to the invention without departing from the concepts disclosed herein. Such modifications are to be considered as included in the following claims, unless these claims by their language expressly state otherwise.

The present invention claimed is:

1. A rearview vehicle mirror apparatus comprising:
   a mirror assembly;
   a mount supporting the mirror assembly and that is adapted to support the mirror assembly on a vehicle windshield; and one of the mirror assembly and the mount including a first housing with a storage pocket shaped to receive a portable electronic communication device and including electrical conductors configured to couple to the communication device, and further including a door shaped to cover the pocket, the door being pivoted to the housing and movable between an open position providing access to the pocket and a closed position for positively retaining the communication device within the pocket.

2. The apparatus defined in claim 1, wherein the first housing defines a downwardly facing access opening to the pocket.

3. The apparatus defined in claim 2, wherein the door includes side flanges and defines a mating pocket shaped to receive the communication device and to fit into the storage pocket.

4. The apparatus defined in claim 3, wherein the access opening is defined in the first housing.

5. The apparatus defined in claim 4, wherein the first housing includes a notch adapted to receive an antenna of the communication device.

6. The apparatus defined in claim 1, wherein the mount includes the pocket and the door is operably attached to the mount.

7. The apparatus defined in claim 6, including a biasing spring biasing the door toward the open position.

8. The apparatus defined in claim 1, including a dampener operably connected to the door for dampening movement of the door.

9. The apparatus defined in claim 8, wherein the door includes a flange having a row of teeth, and the dampener includes a pinion gear operably engaging the teeth for dampened movement as the door is opened and closed.

10. The apparatus defined in claim 1, including a latch for securely holding the door in the closed position.

11. The apparatus defined in claim 10, wherein the latch is a push-push latch configured to engage and hold the door in the closed position when the door is pushed closed and released, and further is configured to release the door to the opened position when the door is again pushed and released.

12. The apparatus defined in claim 11, wherein the push-push latch includes a track formed in one of the mount and the door, and a push-push follower on the other of the mount and the door for engaging the track.

13. The apparatus defined in claim 1, including a biasing device that biases the door toward the opened position.

14. The apparatus defined in claim 1, wherein the pocket is formed in the mount.

15. The apparatus defined in claim 14, wherein the pocket is oriented at a vertical angle and is downwardly facing.

16. The apparatus defined in claim 1, including a limiting device on the one of the housing and the mount that is configured to engage the door and limit the opening movement of the door.

17. The apparatus defined in claim 16, wherein the limiting device includes a slot and pin that follows the slot as the door is opened and closed.

18. The apparatus defined in claim 1, wherein at least one of the door and the mount include a notch for receiving an antenna of the communication device, so that the antenna can extend from the pocket when the communication device is positioned within the pocket.

19. The apparatus defined in claim 1, including contacts in the one of the mount and the door for engaging mating contacts on the communication device for recharging the communication device.

20. The apparatus defined in claim 1, wherein the mount includes a ball pivot adjustment device interconnecting the mirror assembly to the mount.

21. The apparatus defined in claim 1, wherein the communication device is a cellular telephone.

22. The apparatus defined in claim 1, wherein the communication device is a personal data apparatus.

23. A rearview vehicle mirror apparatus comprising:
a mirror assembly including a housing;
a mount supporting the mirror assembly and that is adapted to adjustably support the mirror assembly proximate a vehicle windshield; and
one of the housing and the mount including a pocket with an access opening shaped to receive a portable electronic communication device and including electrical conductors configured to couple to the communication device, and further including a releasable retainer pivoted to the one of the housing and the mount and shaped to selectively cover at least a portion of the access opening to positively retain the communication device in the pocket.

24. The apparatus defined in claim 23, wherein the retainer comprises a door that, when closed, substantially covers the access opening.

25. The apparatus defined in claim 23, including a push-push latch on the door and the one of the housing and the mount for holding the door in a closed position to retain the communication device in the pocket.

26. The apparatus defined in claim 1, including a portable electronic communication device located in the pocket and coupled to the electrical conductors.

27. The apparatus defined in claim 23, including a portable electronic communication device located in the pocket and coupled to the electrical conductors.

* * * * *